United States Patent [19]
Kotlar

[11] 3,962,926
[45] June 15, 1976

[54] STAMPED SHEET METAL PULLEY

[76] Inventor: Edward A. Kotlar, 21115 Mack Ave., Grosse Pointe Woods, Mich. 48236

[22] Filed: Feb. 3, 1975

[21] Appl. No.: 546,615

[52] U.S. Cl. .............................. 74/230.8; 74/230.3; 29/159 R
[51] Int. Cl.² ........................................ F16H 55/54
[58] Field of Search .......... 74/230.8, 230.01, 230.3; 29/159 R, 159.01

[56] References Cited
UNITED STATES PATENTS

| | | | |
|---|---|---|---|
| 1,700,416 | 1/1929 | Nelson | 74/230.8 |
| 2,680,380 | 6/1954 | Bagley | 74/230.8 |
| 2,741,134 | 4/1956 | Bagley | 74/230.8 |
| 2,846,893 | 8/1958 | Bagley | 74/230.8 |
| 3,719,980 | 3/1973 | Van Bussel | 29/159 R |

Primary Examiner—Samuel Scott
Assistant Examiner—A. Russell Burke
Attorney, Agent, or Firm—Barnes, Kisselle, Raisch & Choate

[57] ABSTRACT

A sheet metal pulley having a pair of stamped sheet metal cups with telescopically interfitted side wall portions and integral flanges forming in cooperation with the flanges of rings received on the cups a plurality of V-shaped grooves. The rings are fixed to the side walls by a plurality of equally circumferentially spaced spot welds. The cups have bottom wall portions without any welds or other distortions therein through which mounting holes extend.

11 Claims, 3 Drawing Figures

STAMPED SHEET METAL PULLEY

This invention relates to pulleys and, more particularly to mass produced stamped sheet metal pulleys.

In the automotive industry there has been a great demand for an inexpensive durable pulley having a long, useful life under severe service conditions such as fan and crankshaft pulleys. Examples of prior sheet metal pulleys for automotive applications are shown in Bagley U.S. Pat. No. 2,680,380, Bagley U.S. Pat. No. 2,741,134 and Nelson U.S. Pat. No. 2,787,914.

Objects of this invention are to provide a stamped sheet metal pulley which is inherently balanced, has improved concentricity and balance, and is of economical manufacture and assembly.

These and other objects, features and advantages of this invention will be apparent from the following description, appended claims and accompanying drawings, in which:

Figure 1:
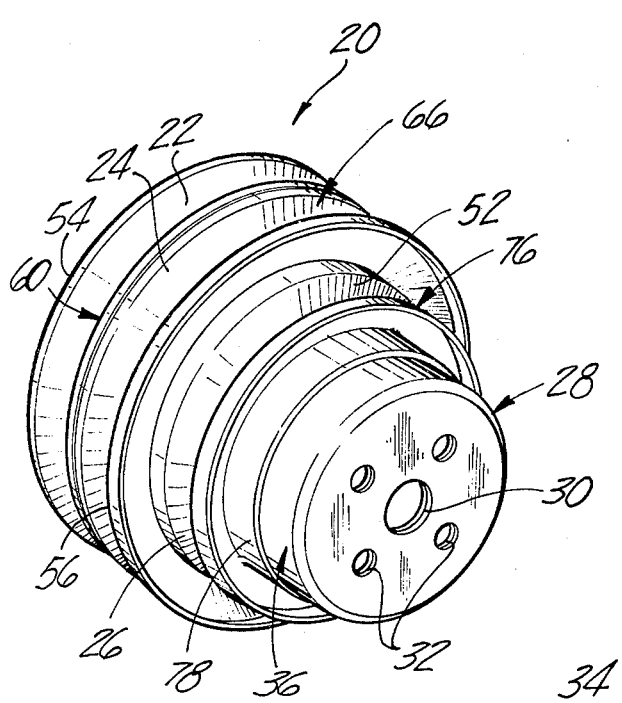
FIG. 1 is an isometric view of a pulley embodying this invention.
Figure 2:
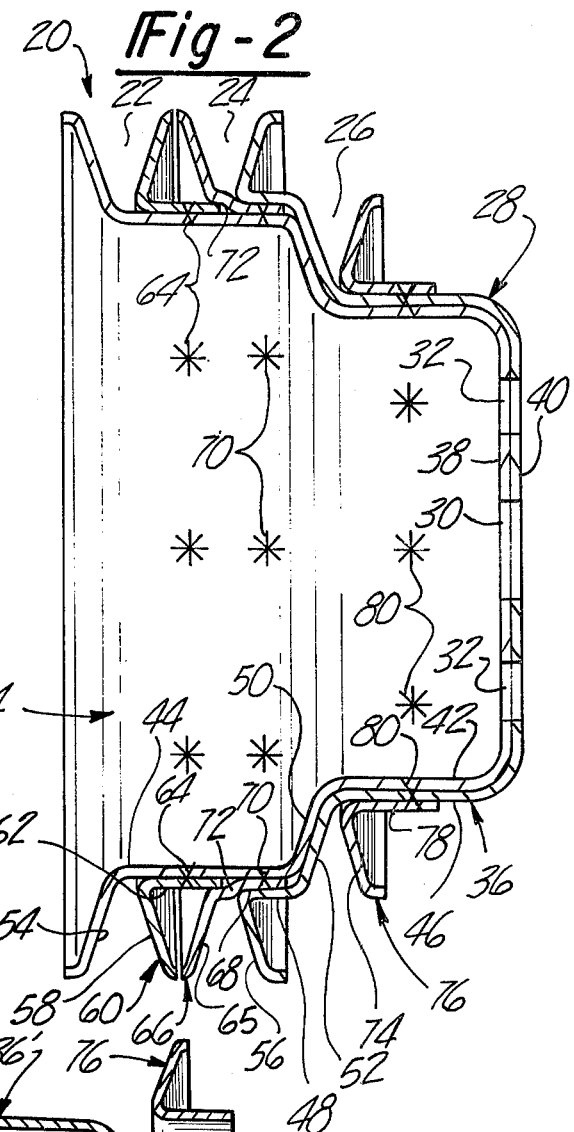
FIG. 2 is an enlarged sectional view of the pulley of FIG. 1.

FIGS. 1 and 2 illustrate a stamped sheet metal pulley 20 embodying this invention. Pulley 20 has three V-shaped grooves 22, 24, 26 and a mounting hub 28 with an axial pilot hole 30 and four equally circumferentially spaced mounting holes 32 therethrough. Pulley 20 has a pair of telescopically interfitted inner and outer cup members 34, 36 each having radially extending bottom walls 38, 40 radially offset axially extending cylindrical side wall portions 42, 44 and 46, 48 integrally interconnected by obliquely inclined intermediate wall portions 50, 52, and obliquely inclined flanges 54 and 56.

Groove 22 of pulley 20 is formed by cooperation of inclined flange 54 with the obliquely inclined flange 58 of a first ring 60 having an integral axially extending cylindrical base 62 fixed to wall portion 44 of inner cup 34 by a plurality of equally circumferentially spaced spot welds 64. Likewise, groove 24 is formed by cooperation of inclined flange 56 of outer cup 36 with the obliquely inclined flange 65 of a second ring 66 having an axially extending cylindrical base 68 fixed to side wall portion 44 of inner cup 34 by a plurality of circumferentially spaced spot welds 70. To provide clearance for the edge of the base of ring 60, the base 68 of ring 66 has an offset portion 72 therein. Similarly, groove 26 is formed by cooperation of inclined wall portion 52 of outer cup 36 with the obliquely inclined flange 74 of a ring 76 having an axially extending cylindrical base 78 fixed to side wall portion 46 of outer cup 36 by a plurality of circumferentially equally spaced spot welds 80.

Figure 3:
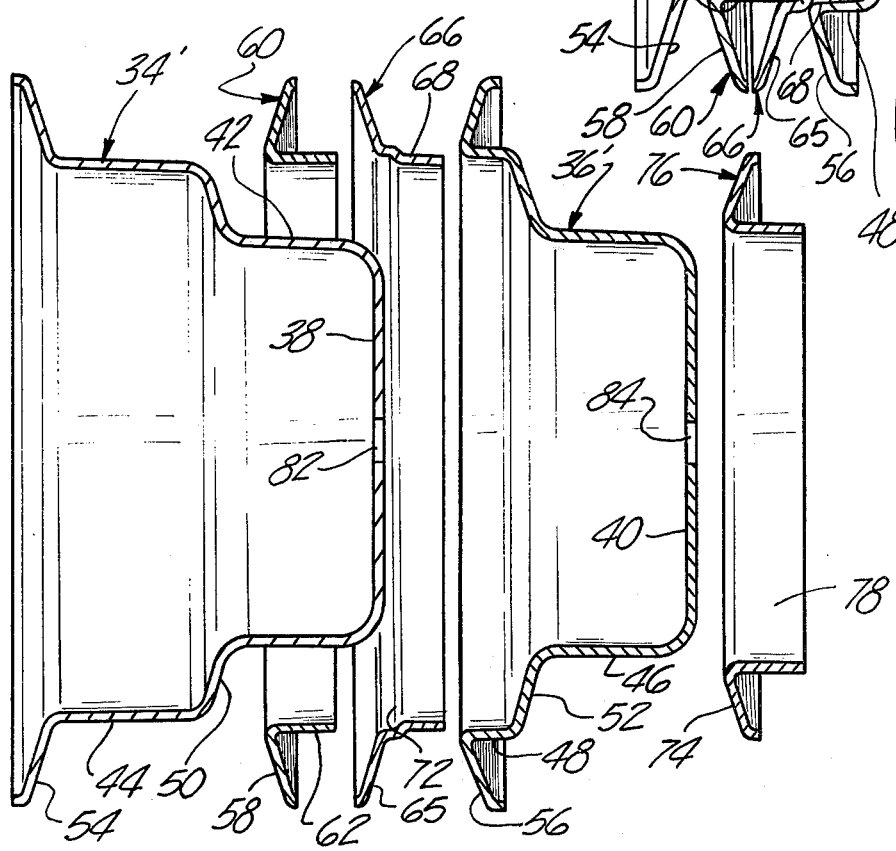
FIG. 3 is an exploded sectional view of the sheet metal stampings forming the pulley of FIG. 1 prior to processing and assembly thereof.

In making pulley 20, cups 34' and 36' and rings 60, 66, and 76 (FIG. 3) are stamped by cold forming press operations from sheet metal, such as 1008 steel, and vent holes 82 and 84 are pierced through the bottom walls of cups 34' and 36'. Each ring 60, 66, and 76 is formed so that its base has a slight interference fit with the side wall portion of its associated cup, and cups 34' and 36' are formed so that the side wall portions 42 and 46 thereof have a slight interference fit. Rings 60 and 66 are press fit onto the outer periphery of side wall portion 44 of cup 34' and fixed thereto by spot welds 64 and 70 to provide a subassembly onto which outer cup 36' is press fit and ring 76 is press fit over outer cup 36'. Pilot hole 30 and mounting holes 32 are pierced through the bottom walls of cups 34' and 36' of the resulting subassembly of rings and cups with the piercing die utilizing the inner peripheral surface of side wall portion 42 of cup 34', or the outer peripheral surface of side wall portion 46 of cup 36', or both, to assure that pilot hole 30 and mounting holes 32 are concentrically located with respect to the axis of rotation of grooves 22, 24, 26 of the completed pulley 20. Thereafter, both of the cups and ring 76 are fixed together by a plurality of circumferentially spaced spot welds 80 to provide a completely finished pulley 20.

In making pulleys 20, it is preferable to pierce holes 30 and 32 in the bottom of cups 34' and 36' before welding ring 76 thereto so that the inner and/or outer peripheries of the side wall portions 42 and 46 of the cups can be used as locating surfaces for aligning the cups and the punches of the piercing dies for piercing the holes before the side wall portions are defaced and distorted by spot welds 80 therein. Making pulleys 20 in this way is believed to improve the balance of the pulleys and the concentricity of the pilot holes 30 and mounting holes 32 with the grooves 22, 24, and 26 of the pulleys. A suitable method and apparatus for making pulley 20 is disclosed in copending U.S. Pat. application Ser. No. 546,616 filed concurrently herewith and entitled "Method And Apparatus For Making A Sheet Metal Pulley" which is incorporated herein by reference.

Pulleys embodying this invention may be readily produced with the same basic design in various sizes having at least two grooves. If desired, pulleys with two grooves of the same or nearly the same pitch diameter can be produced by eliminating ring 76 and pulleys with two grooves of substantially different pitch diameters can be produced by eliminating rings 60 and 66, modifying one of the cups to position the flanges 54 and 56 of the cups adjacent one another to form one of the grooves, and retaining ring 76. Pulleys with more than three grooves may be produced by either extending the side walls of the cups and adding pairs of flanged rings thereto or adding another diametrically enlarged side wall portion to the cups and telescoping additional flanged rings thereon.

Due to all of the components of pulleys 20 being stamped sheet metal parts fixed together by circumferentially equally spaced spot welds, pulleys 20 are inherently balanced which eliminates the necessity of separate balancing operations, thereby decreasing the cost of manufacture and assembly of the pulleys. The flat mounting surfaces of bottom walls 38 and 40 of pulleys 20 are not defaced or distorted by any spot welds therein. Thus, true surfaces for mounting the pulley are provided without requiring any machining or restriking operations, thereby decreasing the cost of manufacture of the pulleys.

Having described my invention, I claim:

1. A stamped sheet metal pulley having at least two grooves comprising:

a. a separate one-piece first cup member of stamped sheet metal having a first cylindrical side wall portion, a flat bottom wall portion integral with said first cylindrical side wall portion and extending generally radially inwardly thereof, a second cylindrical side wall portion having a diameter exceeding the diameter of said first cylindrical side wall portion and being axially spaced from said first cylindrical side wall portion, an annular intermediate wall portion integral with, obliquely inclined to, and interconnecting said first and second cylindrical side wall portions and extending continuously generally radially outwardly of said first cylindrical side wall portion, and an annular flange integral with, obliquely inclined to, and extending generally radially outwardly of said second cylindrical side wall portion of said first cup member adjacent the open end of said first cup member;

b. a separate one-piece second cup member of stamped sheet metal having a first cylindrical side wall portion telescopically interengaged with an interference fit over said first cylindrical side wall portion of said first cup member, a flat bottom wall portion integral with said first cylindrical side wall portion of said second cup member and extending generally radially inwardly thereof, and an annular flange integral with, obliquely inclined to, and extending generally radially outwardly of said first cylindrical side wall portion of said second cup member, said cup members being interengaged such that said flat bottom wall portions of said cup members are in abutting co-planar engagement and said annular flanges are spaced apart axially to each define at least in part a groove of the pulley;

c. a plurality of circumferentially equally spaced spot welds in and fixing said first cylindrical side wall portions of said cup members together;

d. at least one mounting hole extending through both of said flat bottom wall portions of said cup members;

e. a separate one-piece first ring of stamped sheet metal having an obliquely inclined annular flange defining in cooperation with said annular flange of said first cup a groove of the pulley and an integral cylindrical base telescopically interengaged with an interference fit over said second cylindrical side wall portion and fixed thereto by a plurality of circumferentially equally spaced spot welds, said annular flange of said first ring being obliquely inclined to and extending generally radially outwardly of said second cylindrical side wall portion of said first cup member.

2. The pulley of claim 1 wherein a plurality of mounting holes extend through both of said flat bottom wall portions of said cup members with the centers of said mounting holes being equally circumferentially spaced on a circle concentric with the grooves of the pulley.

3. The pulley of claim 1 wherein there are no welds in said flat bottom wall portions of said cup members.

4. The pulley of claim 1 wherein both of said flat bottom wall portions of said cup members have a plurality of mounting holes therethrough with the centers of said mounting holes being circumferentially spaced on a circle concentric with the grooves of the pulley, and said flat bottom wall portions of said cup members do not have any welds therein.

5. A stamped sheet metal pulley having at least two grooves comprising:

a. a separate one-piece first cup member of stamped sheet metal having a first cylindrical side wall portion, a flat bottom wall portion integral with said first cylindrical side wall portion and extending generally radially inwardly thereof, a second cylindrical side wall portion having a diameter exceeding the diameter of said first cylindrical side wall portion and being axially spaced from said first cylindrical side wall portion, an annular intermediate wall portion integral with, obliquely inclined to, and interconnecting said first and second cylindrical side wall portions and extending continuously generally radially outwardly of said first cylindrical side wall portion, and an annular flange integral with, obliquely inclined to, and extending generally radially outwardly of said second cylindrical side wall portion of said first cup member adjacent the open end of said first cup member;

b. a separate one-piece second cup member of stamped sheet metal having a first cylindrical side wall portion telescopically interengaged with an interference fit over said first cylindrical side wall portion of said first cup member, a flat bottom wall portion integral with said first cylindrical side wall portion of said second cup member and extending generally radially inwardly thereof, a second cylindrical side wall portion having a diameter larger than the diameter of said second cylindrical side wall portion of said first cup member and being coaxial with and axially spaced from said first cylindrical side wall portion of said second cup member, an annular flange integral with, obliquely inclined to, and extending generally radially outwardly of said second cylindrical side wall portion of said second cup member adjacent the open end of said second cup member, said second cylindrical side wall portion of said second cup member being telescoped over at least a portion of said second cylindrical side wall portion of said first cup member, and an intermediate wall portion interposed between, integrally interconnected with, and obliquely inclined to said first and second cylindrical side wall portions of said second cup member and extending continuously generally radially outwardly of said first cylindrical side wall portion of said second cup member; said cup members being interengaged such that said flat bottom wall portions of said cup members are in abutting co-planar engagement and said annular flanges are spaced apart axially to each define at least in part a groove of the pulley;

c. a plurality of circumferentially equally spaced spot welds in and fixing said first cylindrical side wall portions of said cup members together;

d. at least one mounting hole extending through both of said flat bottom wall portions of said cup members;

e. a separate one-piece first ring of stamped sheet metal having an obliquely inclined annular flange defining at least in part a groove of the pulley and an integral cylindrical base telescopically interengaged with an interference fit over one of said cylindrical side wall portions and fixed thereto by a plurality of circumferentially equally spaced spot welds, said annular flange of said first ring being obliquely inclined to and extending generally radially outwardly of said one cylindrical side wall portion.

6. The pulley of claim 5 wherein there are no welds in said flat bottom wall portions of said cup members.

7. The pulley of claim 5 wherein a plurality of mounting holes extend through both of said flat bottom wall portions of said cup members with the centers of said mounting holes being equally circumferentially spaced on a circle concentric with the grooves of the pulley.

8. The pulley of claim 7 wherein there are no welds in said flat bottom wall portions of said cup members.

9. The pulley of claim 5 wherein said first ring is telescopically interengaged with an interference fit over said first cylindrical side wall portion of said second cup member and fixed thereto by a plurality of circumferentially equally spaced spot welds, and said annular flange of said first ring cooperates with said intermediate wall portion of said second cup member in defining a groove of the pulley.

10. The pulley of claim 9 which also comprises a separate one-piece second ring of stamped sheet metal having an obliquely inclined annular flange cooperating with said annular flange of said first cup member in defining a groove of the pulley and also having a cylindrical base integral with said annular flange of said second ring, said cylindrical base of said second ring being telescopically interengaged with an interference fit over said second cylindrical side wall portion of said first cup member and fixed thereto by a plurality of circumferentially equally spaced spot welds, and a separate one-piece third ring of stamped sheet metal having an obliquely inclined annular flange cooperating with said annular flange of said second cup in defining a groove of the pulley and also having a cylindrical base integral with said annular flange of said third ring, said cylindrical base of said third ring being telescopically interengaged with an interference fit over said second cylindrical side wall portion of said first cup member and fixed thereto by a plurality of circumferentially equally spaced spot welds.

11. The pulley of claim 10 wherein there are no welds in said flat bottom wall portions of said cup members.

* * * * *